(12) United States Patent
Green et al.

(10) Patent No.: US 8,874,459 B1
(45) Date of Patent: Oct. 28, 2014

(54) SYSTEM AND METHOD FOR PROVIDING FLIGHT DATA SERVICES

(75) Inventors: Tuell C. Green, Euless, TX (US); Murali Ande, Flower Mound, TX (US); Kunal Shah, Irving, TX (US); James T. Diamond, Grapevine, TX (US); Laidlaw R. Fletcher, Santa Fe, NM (US)

(73) Assignee: American Airlines, Inc., Fort Worth, TX (US)

( * ) Notice: Subject to any disclaimer, the term of this patent is extended or adjusted under 35 U.S.C. 154(b) by 774 days.

(21) Appl. No.: 12/683,984

(22) Filed: Jan. 7, 2010

Related U.S. Application Data

(63) Continuation-in-part of application No. 12/183,645, filed on Jul. 31, 2008, now Pat. No. 8,615,418.

(60) Provisional application No. 61/143,075, filed on Jan. 7, 2009.

(51) Int. Cl.
*G06Q 10/00* (2012.01)
*G06Q 50/00* (2012.01)

(52) U.S. Cl.
USPC .............. 705/7.22; 705/5; 705/7.12; 701/120

(58) Field of Classification Search
CPC . G06Q 10/02; G06Q 10/025; G06Q 10/0631; G06Q 10/06312; G06Q 50/30; G08G 5/0017; G08G 5/0039
USPC .......................... 705/5, 6, 7.12, 7.22; 701/120
See application file for complete search history.

(56) References Cited

U.S. PATENT DOCUMENTS

| | | | |
|---|---|---|---|
| 5,265,023 A * | 11/1993 | Sokkappa | 701/120 |
| 6,044,353 A | 3/2000 | Pugliese | |
| 6,108,636 A | 8/2000 | Yap et al. | |
| 6,161,097 A | 12/2000 | Glass et al. | |
| 6,314,361 B1 | 11/2001 | Yu et al. | |
| 6,408,276 B1 | 6/2002 | Yu et al. | |
| 6,721,714 B1 | 4/2004 | Baiada et al. | |
| 7,702,427 B1 * | 4/2010 | Sridhar et al. | 701/4 |
| 2002/0107714 A1 | 8/2002 | Whitlock et al. | |
| 2002/0138194 A1 * | 9/2002 | Flynn et al. | 701/120 |
| 2002/0177943 A1 | 11/2002 | Beardsworth | |
| 2003/0050746 A1 * | 3/2003 | Baiada et al. | 701/3 |
| 2003/0122685 A1 * | 7/2003 | Tuttle | 340/825.49 |
| 2003/0139875 A1 | 7/2003 | Baiada et al. | |
| 2003/0167109 A1 | 9/2003 | Clarke et al. | |

(Continued)

FOREIGN PATENT DOCUMENTS

WO  WO 2008/061793  5/2008

OTHER PUBLICATIONS

Dareing, et al., Traffic Management and Airline Operations, Proceedings of the American Control Conference, 2002, pp. 1302-1307.*
U.S. Appl. No. 12/183,645, filed Jul. 31, 2008, Niznik et al.

(Continued)

*Primary Examiner* — Daniel Vetter
(74) *Attorney, Agent, or Firm* — Haynes and Boone, LLP

(57) ABSTRACT

A system and method according to which travel data is received, a projected times forecast is generated using the travel data, a probable times forecast is generated using the projected times forecast, and a postable times forecast is generated using the probable times forecast. In an exemplary embodiment, the travel data is airline flight data.

3 Claims, 8 Drawing Sheets

(56) References Cited

U.S. PATENT DOCUMENTS

| | | | |
|---|---|---|---|
| 2003/0191678 A1* | 10/2003 | Shetty et al. | 705/8 |
| 2003/0225598 A1 | 12/2003 | Yu et al. | |
| 2004/0054550 A1 | 3/2004 | Cole et al. | |
| 2005/0192701 A1 | 9/2005 | Ben-Ezra | |
| 2005/0216281 A1 | 9/2005 | Prior | |
| 2005/0246224 A1 | 11/2005 | McKanna et al. | |
| 2006/0173609 A1* | 8/2006 | Green | 701/120 |
| 2007/0043598 A1 | 2/2007 | Bertram et al. | |
| 2007/0219833 A1 | 9/2007 | Trautman | |
| 2008/0215407 A1* | 9/2008 | Pachon et al. | 705/8 |
| 2009/0125357 A1 | 5/2009 | Vannette et al. | |

OTHER PUBLICATIONS

U.S. Appl. No. 12/349,926, filed Jan. 7, 2009, Tansupaswatdikul et al.
U.S. Appl. No. 12/350,160, filed Jan. 7, 2009, Ande et al.
U.S. Appl. No. 13/350,178, filed Jan. 7, 2009, Osborne et al.
U.S. Appl. No. 61/143,075, filed Jan. 7, 2009, Green et al.
U.S. Appl. No. 12/686,083, filed Jan. 12, 2010, Ande et al.

Jeff Bailey, "Airlines Work on Systems to Reduce Delays" The New York Times, Nov. 15, 2007, 4 pages, nytimes.com, N.Y., USA.

Office Action mailed May 12, 2011, by the USPTO, regarding U.S. Appl. No. 12/183,645.

Office Action mailed Jun. 14, 2011, by the USPTO, regarding U.S. Appl. No. 12/350,178.

Office Action mailed Jun. 14, 2011, by the USPTO, regarding U.S. Appl. No. 12/350,160.

Office Action mailed Jul. 19, 2011, by the USPTO, regarding U.S. Appl. No. 12/349,926.

Erikse, Collaborative Decision Making Information Management in Airports, 2002, IEEE 0-7803-7367-7/02.

Fuhr, Robust Flight Scheduling—An Analytic Approach to Performance Evaluation and Optimization, Apr. 23, 2007.

Schaefer, et al., Improving Airline Operational Performance through Schedule Perturbation, Oct. 28, 2002.

Arguello, et al., A GRASP for Aircraft Routing in Response to Groundings and Delays, 1997, J. of Combinatorial Optimization 5, 211-228.

* cited by examiner

| AIRCRAFT 457 | DALLAS | AUSTIN | SAN JOSE | CHICAGO | INDIANAPOLIS |
|---|---|---|---|---|---|
| SCHEDULED DEPARTURE | 11:00 (actual: 12:00) | 13:00 | 15:00 | 17:00 | 19:00 |
| PROJECTED | | 13:45 | 16:00 | 18:00 | 20:00 |
| PROBABLE | | 13:45 | 16:00 | 17:15 | 19:15 |
| POSTABLE | | 13:35 | 15:30 | | |

SYSTEM AND METHOD FOR PROVIDING FLIGHT DATA SERVICES

CROSS REFERENCE TO RELATED APPLICATIONS

This application is a continuation-in-part of U.S. patent application Ser. No. 12/183,645, filed on Jul. 31, 2008, the disclosure of which is incorporated herein by reference.

This application claims the benefit of the filing date of U.S. patent application No. 61/143,075, filed on Jan. 7, 2009, the disclosure of which is incorporated herein by reference.

This application is related to (1) U.S. patent application Ser. No. 12/183,645, filed on Jul. 31, 2008; (2) U.S. patent application Ser. No. 12/349,926, filed on Jan. 7, 2009; (3) U.S. patent application Ser. No. 12/350,178, filed on Jan. 7, 2009; (4) U.S. patent application Ser. No. 12/350,160, filed on Jan. 7, 2009; and (5) U.S. patent application No. 61/143,075, filed on Jan. 7, 2009, the disclosures of which are incorporated herein by reference.

BACKGROUND

The present disclosure relates in general to a system and method for automatically managing and providing data associated with travel routes.

DETAILED DESCRIPTION

Figure 1:
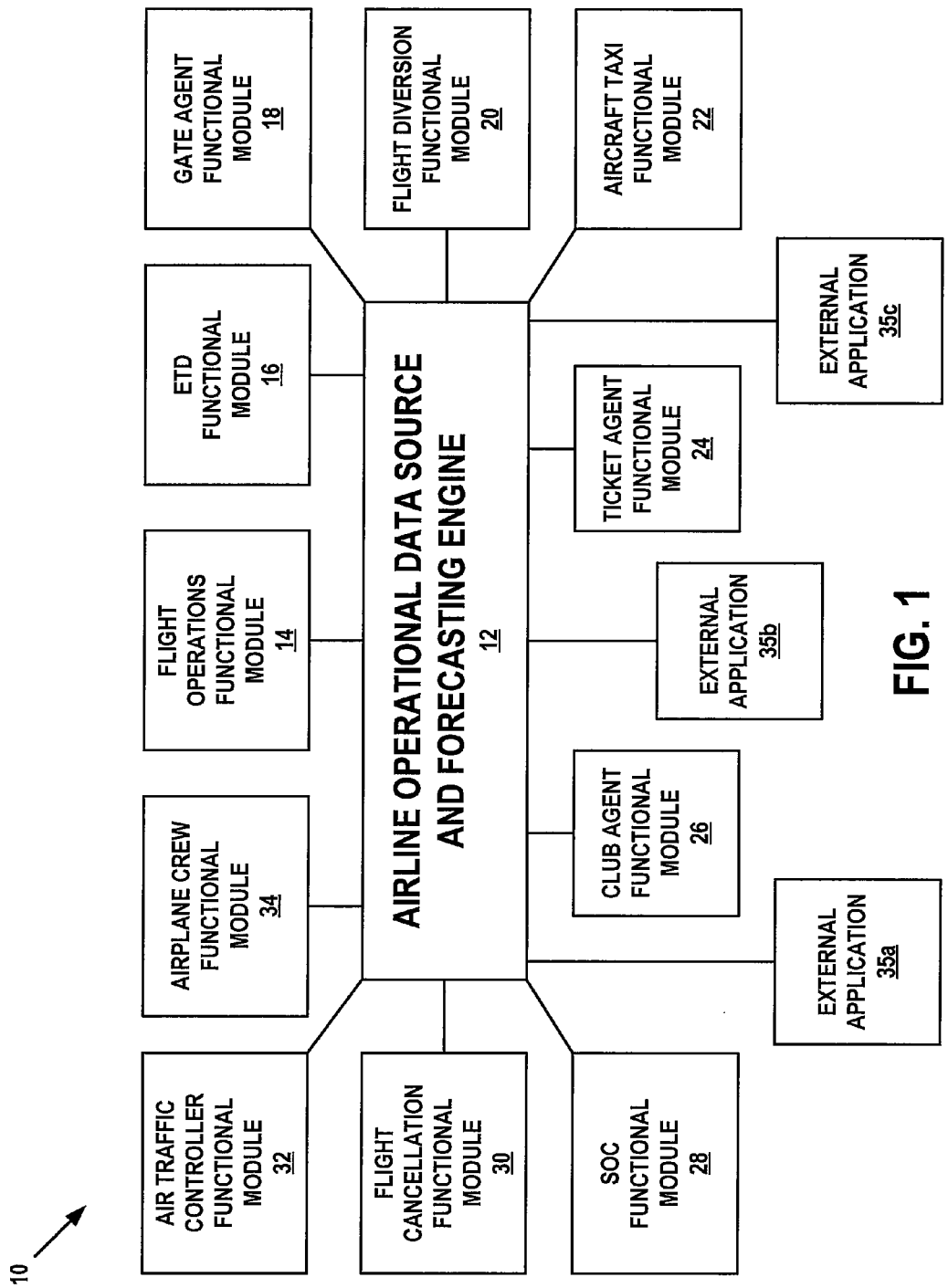
FIG. 1 is diagrammatic illustration of a system according to an exemplary embodiment, the system including an airline operational data source and forecasting engine, and functional modules and external applications operably coupled thereto.

In an exemplary embodiment, as illustrated in FIG. 1, a system is generally referred to by the reference numeral 10 and includes an airline operational data source and forecasting engine 12. Functional modules are operably coupled to, and in communication with, the engine 12, namely a flight operations functional module 14, an Estimated Time of Departure (ETD) functional module 16, a gate agent functional module 18, a flight diversion functional module 20, an aircraft taxi functional module 22, a ticket agent functional module 24, a club agent functional module 26, a system operations control (SOC) functional module 28, a flight cancellation functional module 30, an air traffic controller functional module 32, and an airplane crew functional module 34. The engine 12 is also operably coupled to, and in communication with, external applications 35a, 35b and 35c.

In several exemplary embodiments, one or more of the functional modules 14, 16, 18, 20, 22, 24, 26, 28, 30, 32 and 34 and the external applications 35a, 35b and 35c are in two-way communication with the engine 12. In several exemplary embodiments, one or more of the functional modules 14, 16, 18, 20, 22, 24, 26, 28, 30, 32 and 34 and the external applications 35a, 35b and 35c are in one-way communication with the engine 12. In several exemplary embodiments, one or more of the functional modules 14, 16, 18, 20, 22, 24, 26, 28, 30, 32 and 34 and the external applications 35a, 35b and 35c are in wireless communication with the engine 12. In several exemplary embodiments, one or more of the functional modules 14, 16, 18, 20, 22, 24, 26, 28, 30, 32 and 34 and the external applications 35a, 35b and 35c are operably coupled to, and in communication with, the engine 12 via a network, such as, for example, the Internet, any type of local area network, any type of wide area network, any type of wireless network, any type of voice network, any type of data network, and/or any combination thereof.

In several exemplary embodiments, one or more of the engine 12 and the functional modules 14, 16, 18, 20, 22, 24, 26, 28, 30, 32 and 34, and the external applications 35a, 35b and 35c include a computer readable medium or memory having a plurality of instructions stored therein, which instructions are accessible to, and executable by, a processor. In several exemplary embodiments, one or more of the engine 12, the functional modules 14, 16, 18, 20, 22, 24, 26, 28, 30, 32 and 34, and the external applications 35a, 35b and 35c include one or more data structures or databases, which databases are accessible to a processor. In several exemplary embodiments, one or more of the engine 12, the functional modules 14, 16, 18, 20, 22, 24, 26, 28, 30, 32 and 34, and the external applications 35a, 35b and 35c include a processor, a computer readable medium or memory operably coupled to the processor, a plurality of instructions stored in the computer readable medium and accessible to, and executable by, the processor, and one or more data structures or databases stored in the computer readable medium and accessible to the processor.

In several exemplary embodiments, the engine 12 provides automatic data collection and management functionally. The engine 12 collects and stores real-time travel data from multiple sources and provides integrated data forecasts to the functional modules 14, 16, 18, 20, 22, 24, 26, 28, 30, 32 and 34 and the external applications 35a, 35b and 35c. In an exemplary embodiment, the travel data collected by the engine 12 is airline flight data that includes one or more of the following: scheduled airline flight departure times, scheduled airline flight arrival times, actual airline flight departure times, actual airline flight arrival times, latest published flight times and status, latest gate assignments, aircraft rotations, crew sequence information, passenger counts and connections, baggage counts and connections, crew legality information, curfew information, and slot restrictions. Additionally, the engine 12 is capable of generating forecasts of downline impacts as a result of existing delays throughout the system.

Figure 2:
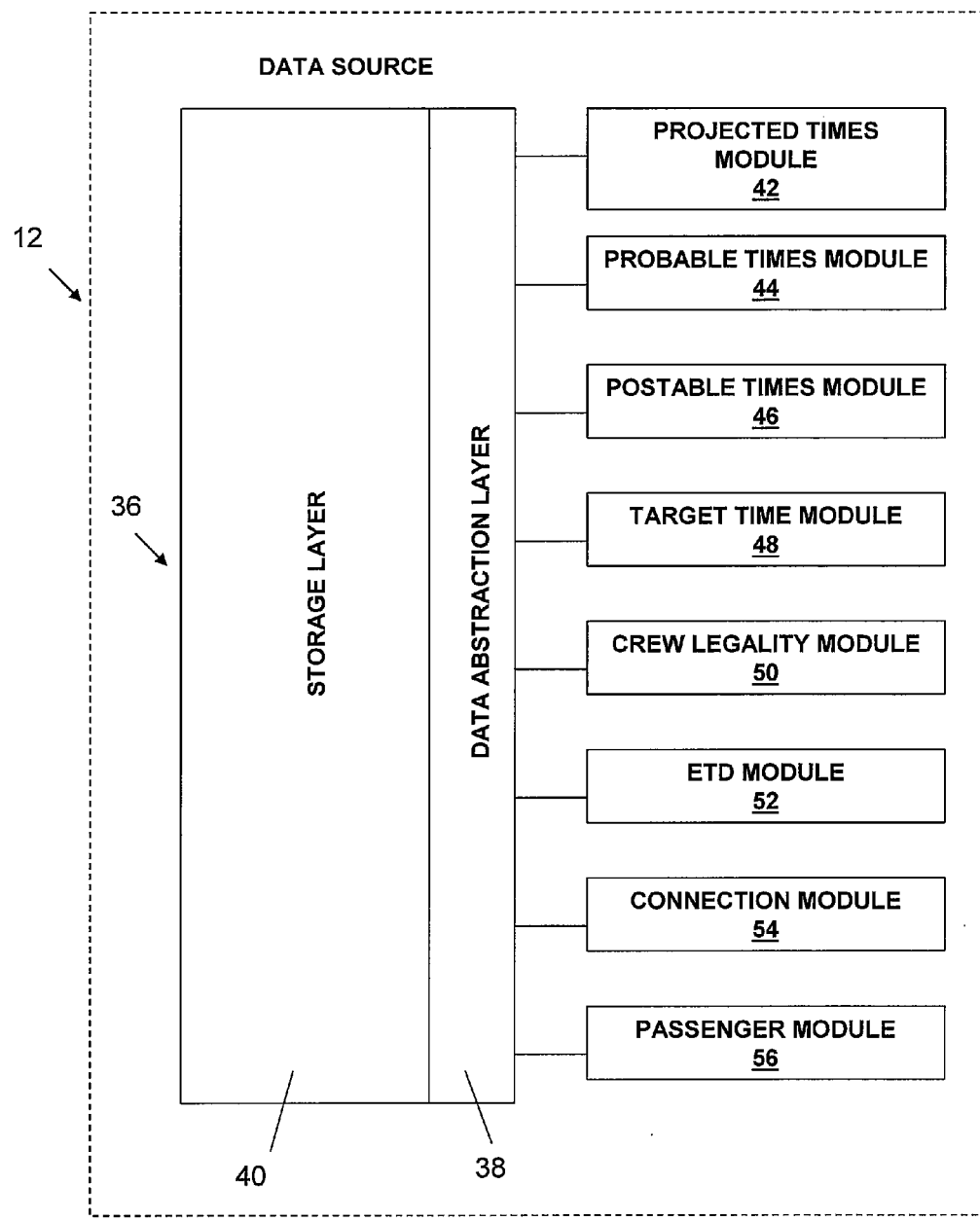
FIG. 2 is a diagrammatic illustration of the forecasting engine of FIG. 1 according to an exemplary embodiment, the system including a data source and multiple engine modules.

Referring to FIG. 2, in several exemplary embodiments the engine 12 comprises a database 36 having an abstraction layer 38 and a storage layer 40. Data entering the engine 12 is stored in the storage layer 40 and is also passed through the abstraction layer 38, which routes the data to engine modules that are operably coupled to, and in communication with, the database 36 and which utilize and augment the data provided by the functional modules 14, 16, 18, 20, 22, 24, 26, 28, 30, 32 and 34 and the external applications 35a, 35b and 35c (FIG. 1). The engine 12 includes a projected times module 42, a probable times module 44, a postable times module 46, a target time module 48, a crew legality module 50, an ETD module 52, a connection module 54 and a passenger manifest module 56.

In an exemplary embodiment, the projected times module 42 automatically propagates deviations from scheduled flight times throughout the remaining scheduled flights for each aircraft and generates forecasted times for those flights based on resource dependencies, taking into account an assumption that no actions will be taken to reduce or adjust delays. In an exemplary embodiment, the projected times forecast generated by the projected times module 42 provides advanced warning of scheduling circumstances giving rise to potential problems (such as, for example, legality and curfew issues).

In an exemplary embodiment, the probable times module 44 automatically analyzes a projected times forecast generated by the projected times module 42 and generates a probable times forecast by factoring-in potential corrective actions that may be taken to reduce or adjust delays in the flight schedule. In an exemplary embodiment, the probable times forecast is used in connection with logistical pre-planning and prioritization of one or more flights. In an exemplary embodiment, a probable times forecast factors-in corrective action according to predetermined parameters relating to reduction or adjustment of delay. In an exemplary embodiment, a probable times forecast factors-in corrective action specified for that forecast by an authority such as, for example, SOC or the FAA. In a further exemplary embodiment, the probable times forecast could use data provided by the functional modules 14, 16, 18, 20, 22, 24, 26, 28, 30, 32 and 34 and the external applications 35a, 35b and 35c.

In an exemplary embodiment, the postable times module 46 automatically analyzes a probable times forecast generated by the probable times module 44 and generates a postable times forecast that contains flight schedule information that is to be released to end users such as, for example, passengers and airport service providers through the external applications 35a, 35b and 35c. In one embodiment, the postable times forecasts are based on probable times forecasts and take into account acceptable ranges of variability in the probable times forecast. In a further exemplary embodiment, the postable times forecast could use data provided by the functional modules 14, 16, 18, 20, 22, 24, 26, 28, 30, 32 and 34 and the external applications 35a, 35b and 35c.

In an exemplary embodiment, the target time module 48 provides updated times for a flight's intended pullback from a gate.

In an exemplary embodiment, the crew legality module 50 evaluates and repairs broken crew pairings and minimizes uncovered flights and standby reserve crews while observing governmental and contractual work rules.

In an exemplary embodiment, the ETD module 52 estimates times of departure for a flight based on data relating to availability of resources. In one embodiment, the ETD module 52 receives data or updates to the data in real-time or near real-time.

In an exemplary embodiment, the connection module 54 evaluates flight options for passengers that are unable to reach a destination through a previously ticketed flight.

In an exemplary embodiment, the passenger module 56 analyzes passenger data and flags passengers for whom further scrutiny is warranted based on predetermined parameters.

In an exemplary embodiment, the engine modules 42, 44, 46, 48, 50, 52, 54 and 56 conduct their operations using comprehensive and integrated flight data provided by the database 36 and transmit all updated and generated data to the database 36 upon completion of each module operation. In an exemplary embodiment, the contents of the database 36 are accessible to any of the functional modules 14, 16, 18, 20, 22, 24, 26, 28, 30, 32 and 34, the engine modules 42, 44, 46, 48, 50, 52, 54 and 56, and the external applications 35a, 35b and 35c. In some such exemplary embodiments, updates to the database 36 are pushed to one or more of any of the functional modules 14, 16, 18, 20, 22, 24, 26, 28, 30, 32 and 34 and the external applications 35a, 35b and 35c.

Referring again to FIG. 1, in an exemplary embodiment, the external application 35a is operated by an authority such as, for example, SOC or the FAA. In an exemplary embodiment, the external application 35b is operated by an airport. In an exemplary embodiment, the external application 35c is operated by an airline for use in operations such as, for example, reservations and ticketing.

In an exemplary embodiment, the flight operations functional module 14 is an integrated station view of flight operations data. The flight operations functional module 14 provides operational information and decision support to tower and operations personnel. The operational information includes departure holds to reduce misconnects, early departures, ETD posting, and identifying gate conflicts. A user interface displays flight information (including departure and arrival times and flight plans), gate information, potential misconnect passengers, same day protection options for misconnect passengers, and incoming connecting passenger information. The module may perform analysis of the integrated data to recommend holding departures.

In an exemplary embodiment, the functional module 16 automatically posts estimated times of departures (ETDs) based on delayed inbound resources (such as aircraft and/or crew). In an exemplary embodiment, the ETD functional module 16 enables each gate at an airport to have its own posting rules. In an exemplary embodiment, the ETD functional module 16 has a user interface that displays gates at airports, allows the creation of groups of gates to allow posting rules to a pre-defined subset of gates, and enables the setting of ETD posting criteria and thresholds.

In an exemplary embodiment, the gate agent functional module 18 provides gate agents with operational information for a specific flight. In an exemplary embodiment, the gate agent functional module 18 has a user interface that displays flight information (including ETD, gate information, flight, and inbound aircraft information, information about inbound connections, downline connections, and inbound crew and aircraft) and information about alternative flights traveling to the destination to which a passenger is headed but unable to make the originally ticketed connecting flight.

In an exemplary embodiment, the aircraft taxi functional module 22 monitors flights system-wide for taxi times that exceed a desired time threshold and provides a user interface that is user-customizable to enable tracking and monitoring of taxi tames. In an exemplary embodiment, the aircraft taxi functional module 22 also generates text message alerts to designated personnel that one or more flights have exceeded certain thresholds for taxi-in or taxi-out. In an exemplary embodiment, the initial time threshold is three hours.

In an exemplary embodiment, the ticket agent functional module 24 provides information to ticket agents about flights that are experiencing some type of disruption (such as delays, mechanical problems, or crew problems). In an exemplary embodiment, the ticket agent functional module 24 alerts ticket agents about possible flight disruptions when processing passengers associated with flights that may have disruptions. In an exemplary embodiment, the ticket agent functional module 24 captures check-in data for passengers and alerts the agent if a flight disruption is expected for that passenger's flight.

In an exemplary embodiment, the club agent functional module 26 provides specialty agents with flight information for designated passengers. In an exemplary embodiment, when a designated passenger visits a designated guest area, the designated passenger checks in with the specialty agent. The specialty agent interfaces with the club agent functional module 26 and inputs the designated passenger's passenger information. The club agent functional module 26 tracks and monitors the flights associated with the designated passengers that are within the designated guest area and can provide alerts if flights associated with the designated passengers are disrupted.

In an exemplary embodiment, the SOC functional module 28 alerts system operations control (SOC) about potential flight delays due to late arriving resources (such as crew or aircraft). In an exemplary embodiment, the SOC functional module 28 provides a view of flight operations, projected departure times, passenger connections, and air traffic control data. In an exemplary embodiment, the SOC functional module 28 provides recommended actions to mitigate delays that are detected in the system. In an exemplary embodiment, the SOC functional module 28 has a user interface that displays information about inbound crews, inbound flights, aircraft, and outbound flights and that receives inputs from a user about the crews, flights, and aircraft.

In an exemplary embodiment, the flight cancellation functional module 30 provides functionality to assist the SOC in determining the flights to cancel during off schedule operations. The flight cancellation functional module 30 analyzes operational constraints while minimizing the disruption to passengers, crews, and aircraft maintenance. In an exemplary embodiment, the flight cancellation functional module 30 has a user interface that displays information about a planned cancellation, including information about crews disrupted, the number of passengers disrupted, the number of passengers disrupted with an alternative connection, information about markets affected by the disruptions, and information about gates affected by the disruptions.

In an exemplary embodiment, the air traffic controller functional module 32 manages slots for air traffic control delay programs. The air traffic controller functional module 32 analyzes and projects delays to detect crew curfew and potential passenger disruption problems. The air traffic controller functional module 32 also redistributes delays to minimize the impact on operations and passengers. In an exemplary embodiment, air traffic controller functional module 32 has a user interface that displays a summary of the impact that slot management will have on passengers and crew, inbound flight and slot details, outbound flight details, and that receives inputs from a user about modifying air traffic control slots.

In an exemplary embodiment, the airplane crew functional module 34 automates the repair of broken crew pairings and minimizes uncovered flights and standby reserve crews while observing governmental and contractual work rules. In an exemplary embodiment, the crew functional module 34 has a user interface that displays the crew members included in a recovery package, the original sequence of a crew member, and the new sequence for the crew member.

Referring to FIG. 1, in the operation of an exemplary embodiment, the engine 12, either periodically or in response to a trigger event, issues a query for all flight data. In an exemplary embodiment, one or more of the functional modules 14, 16, 18, 20, 22, 24, 26, 28, 30, 32 and 34 and the external applications 35a, 35b and 35c respond to the query with flight data and crew data in raw form covering the time period 144 hours after the time of the query was made. In one embodiment, the flight data includes:

flight number: an identifier for the flight, destination: the destination for the flight, scheduled departure: the time that the aircraft is scheduled to pull back from the gate, published departure time: the published time that the aircraft is scheduled to pull back from the gate, target departure: the time that the aircraft is targeted to pull back from the gate, projected departure: the departure time based on the projected forecast, departure delay: the number of minutes that the flight has been delayed from the scheduled departure, scheduled arrival: the time that the aircraft is scheduled to pull up to a gate, published arrival time: the published time that the aircraft is scheduled to pull up to a gate, projected arrival: the arrival time based on the projected forecast, scheduled block time: number of minutes that reflects the time between the scheduled arrival time and the scheduled departure time, block difference: the number of minutes that reflects the time between the scheduled block time and the planned time between wheels off ground and wheels on ground, missed connections: the number of passengers on the flight that may miss a connection based on the projected arrival, hold connection delay: the number of minutes the flight would need to be delayed to allow at least one of missed connection on another flight to make the flight, hold arrive on-time: the number of minutes a flight could be delayed and still arrive on or before the scheduled arrival, departure gate: the gate from which the aircraft departs, arrival gate: the gate at which the aircraft arrives, cost index: a numerical value associated with the cost of fuel based on the planned flight speed, downline destination: the destination of the next flight for the aircraft, downline turn: time that the aircraft is scheduled to be on the ground before the next flight of the aircraft, and slack: the number of minutes above the minimum ground time before the next flight of the aircraft.

In an exemplary embodiment, the engine 12 also obtains or accesses passenger data. In an exemplary embodiment, the passenger data is obtained every four hours and contains real-time booking information covering a 72-hour period. In another exemplary embodiment, the passenger data is requested or obtained each time a change occurs on a flight. In another exemplary embodiment, the passenger data is requested if a flight's load factor exceeds a predetermined threshold. In an exemplary embodiment, the passenger data includes names, club member identification numbers, passenger number record, connecting flight information, and bag information.

In another exemplary embodiment, the engine 12 may obtain ADL files from a governmental organization (e.g., the Federal Aviation Administration), cargo information (such as unit, weight, connection information, and priority), and maintenance information for each aircraft.

Figure 3:
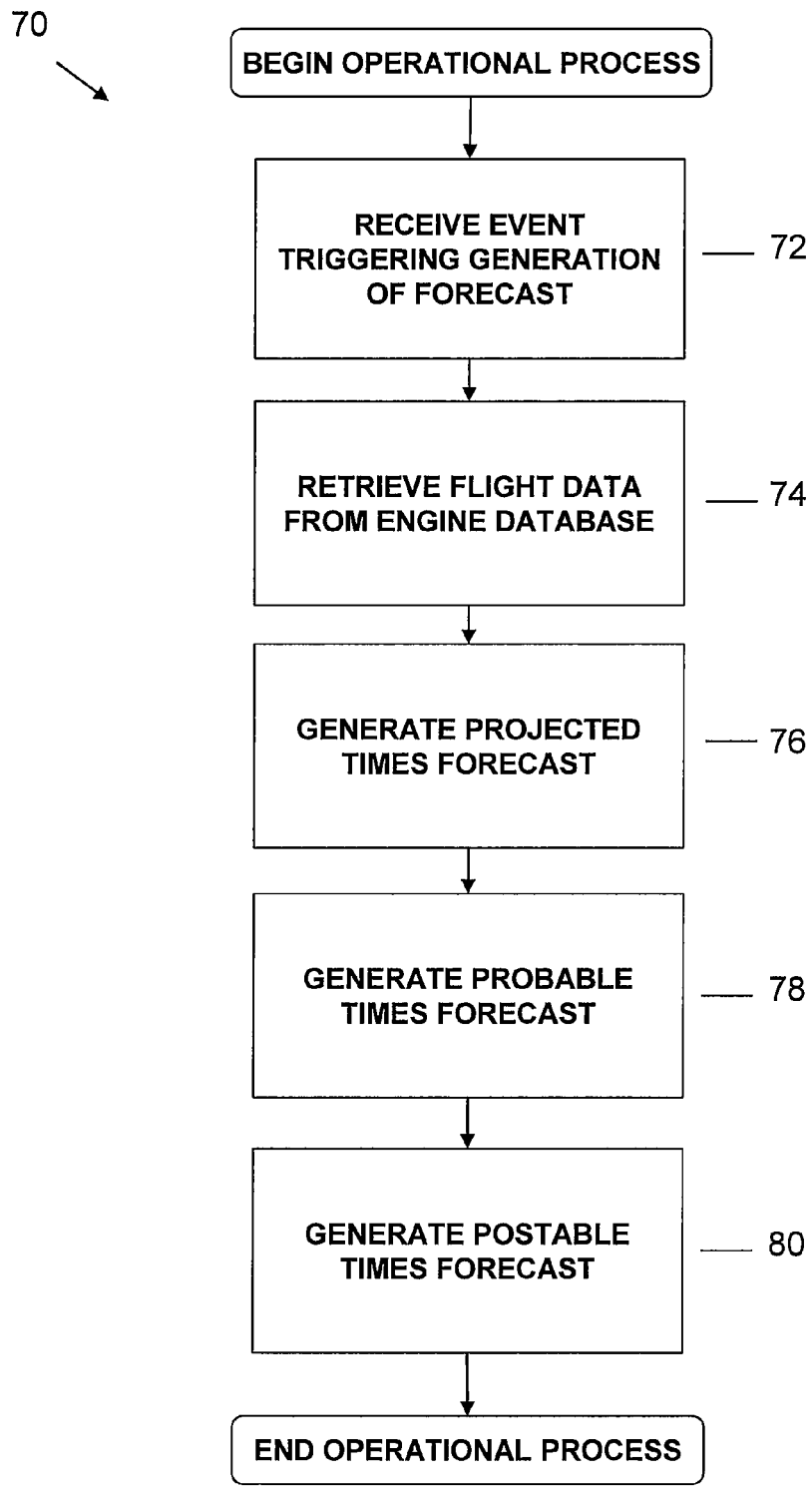
FIG. 3 is a flow chart illustration of a forecast process conducted by the components shown in FIG. 2, according to an exemplary embodiment.

Referring now to FIG. 3 (in conjunction with FIG. 2), an example operational process 70 for generating forecasts in one embodiment is shown. At step 72, a trigger event occurs. A trigger event can be an express event or an inferred event. One example of an express event is a request by an authority (such as, for example, the SOC or FAA) for the generation of a flight times forecast. One example of an inferred event is the expiration of a predetermined period of time subsequent to the most recently generated flight times forecast. Another example of an inferred trigger is the engine 12 identifying an actual delay in the departure of a flight (meaning that a flight has departed after its scheduled departure time) and the automatic adjustment of a portion of the flight's schedule in anticipation of such a delay. Yet another example of an inferred trigger event is when a data item upon which a portion of a previous flight times forecast was based has been modified.

In step 74, the flight data for the relevant flight is retrieved from database 36. In one embodiment, the data that is retrieved is a record of all data associated with the relevant flight. In step 76, the projected times module 42 automatically generates a projected times forecast for the flight. In step 78, the probable times module 44 automatically generates a probable time forecast for the flight. In step 80, the postable times module 46 automatically generates a postable times forecast for the flight.

Figure 4:
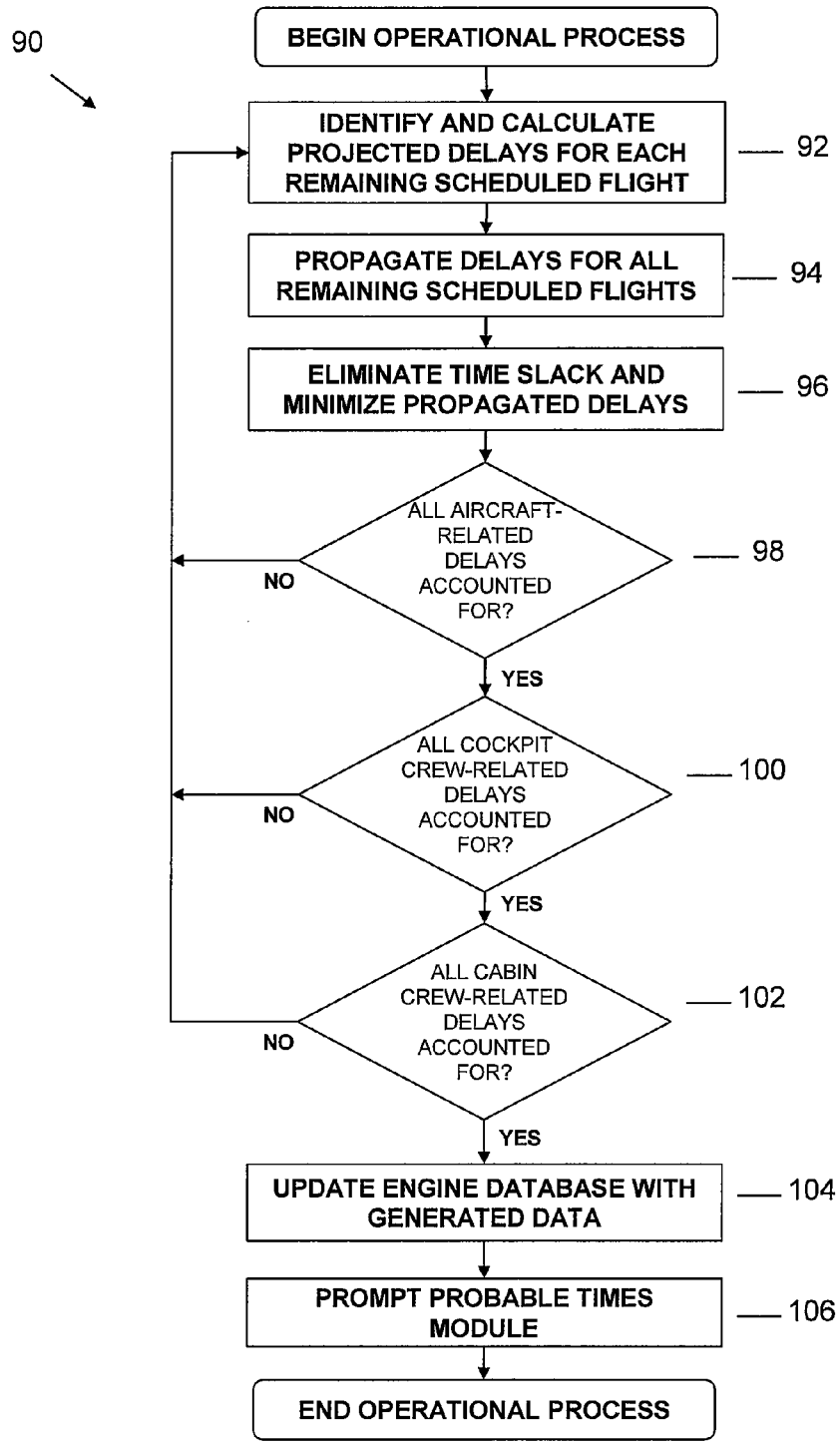
FIG. 4 is a flow chart illustration of a forecasting method executed during the operation of the process of FIG. 3, according to an exemplary embodiment.

Referring now to FIG. 4 (in conjunction with FIG. 2), an example operational process 90 for generating a projected forecast is shown. At step 92, the projected times module 42 evaluates the travel data for the flight and identifies delays by evaluating discrepancies between the scheduled departure time and the actual departure time and between the scheduled arrival time and actual arrival time that have occurred in connection with the flight. If a delay is identified, then at step 94, the value of that delay is automatically propagated for the remainder of the flight legs scheduled for the aircraft. For example, if the identified delay is 60 minutes, then the projected departure and projected arrival for each subsequent connection for that flight leg will be adjusted by 60 minutes. In one embodiment, the propagation of the delay is performed without consideration of any adjustments that might be made or corrective actions that might be taken to reduce the delay value. The result of the propagation is a projected times forecast showing the cumulative effect of a delay on the remainder of connections for the flight.

After the propagation in the step 94, or if no delays were identified in the step 92, the operational process proceeds to step 96 and attempts to minimize each propagated delay by eliminating any time slack in the aircraft's flight schedule. For example, if the minimum ground time required for readying an aircraft and crew between two particular flight legs is 30 minutes, while the flight schedule reflects a scheduled ground time of 45 minutes between those flight legs, the projected times module 42 reduces the ground time between those flight legs by up to 15 minutes if doing so will reduce the delay value propagated to the next scheduled departure.

At step 98, the projected times module 42 analyzes the impact of aircraft availability on the projected times forecast. If, for example, the aircraft is now anticipated to be unavailable for a scheduled departure time due to a regulatory restriction or maintenance operation, the projected times module 42 then proceeds again to the step 92 and calculates the delay that will result from the aircraft unavailability. The projected times module 42 then proceeds again to the step 94 and propagates the value of this new delay for the remainder of the flight legs scheduled for the aircraft. The projected times module 42 then proceeds again to the step 96 and eliminates any time slack to minimize the propagated delay value.

After the aircraft availability delay is propagated, or if no such delays were identified in the step 98, the projected times module 42 then proceeds to step 100 and analyzes the impact of cockpit crew availability on the projected times forecast. If, for example, one or more members of the cockpit crew are anticipated to be unavailable for a scheduled departure time due to a regulatory or contractual restriction, the projected times module 42 then proceeds again to the step 92 and calculates the delay that will result from the cockpit crew unavailability. The projected times module 42 then proceeds again to the step 94 and propagates the value of this new delay for the remainder of the flight legs scheduled for the aircraft. The projected times module 42 then proceeds again to the step 96 and eliminates any time slack to minimize the propagated delay value.

After the cockpit crew availability delay is propagated, or if no such delays were identified in the step 100, the projected times module 42 then proceeds to step 102 and analyzes the impact of cabin crew availability on the projected times forecast. If, for example, one or more members of the cabin crew are anticipated to be unavailable for a scheduled departure time due to a regulatory or contractual restriction, the projected times module 42 then proceeds again to the step 92 and calculates the delay that will result from the cabin crew unavailability. The projected times module 42 then proceeds again to the step 94 and propagates this new delay for the remainder of the flight legs scheduled for the aircraft. The projected times module 42 then proceeds again to the step 96 and eliminates any time slack to minimize the propagated delay value.

In some exemplary embodiments, the projected times module 42 makes use of historical data in identifying potential delays in the steps 98, 100 and 102. In some exemplary embodiments, for example, the project times module 42 makes use of historical data relating to turn times, or the time required to prepare and ready each of the aircraft and crew for a flight. In some such exemplary embodiments, although the projected times module 42 does not account for potential corrective actions that may be taken to reduce or adjust flight delays, the projected times module 42 does calibrate forecasted ground times by using the typical time requirements for similar flight preparation operations conducted under similar circumstances. In other such exemplary embodiments, the projected times module 42 utilizes typical time requirements determined by analysis of all previous flights. In some exemplary embodiments, the project times module 42 takes into account, for example, aircraft type, crew requirements, type of station (e.g., whether the airport is a center of regional operations (a "hub") or an outlying destination (a "spoke")), departure location, destination location and load factor (count or percentage of aircraft occupancy).

The projected times module 42 then proceeds to step 104 and updates the database 36 with the data generated during the operational process 90 and the completed projected times forecast. The projected times module 42 then proceeds to step 106 and prompts the probable times module 44 to initiate operational process 110 (FIG. 5).

Figure 5:
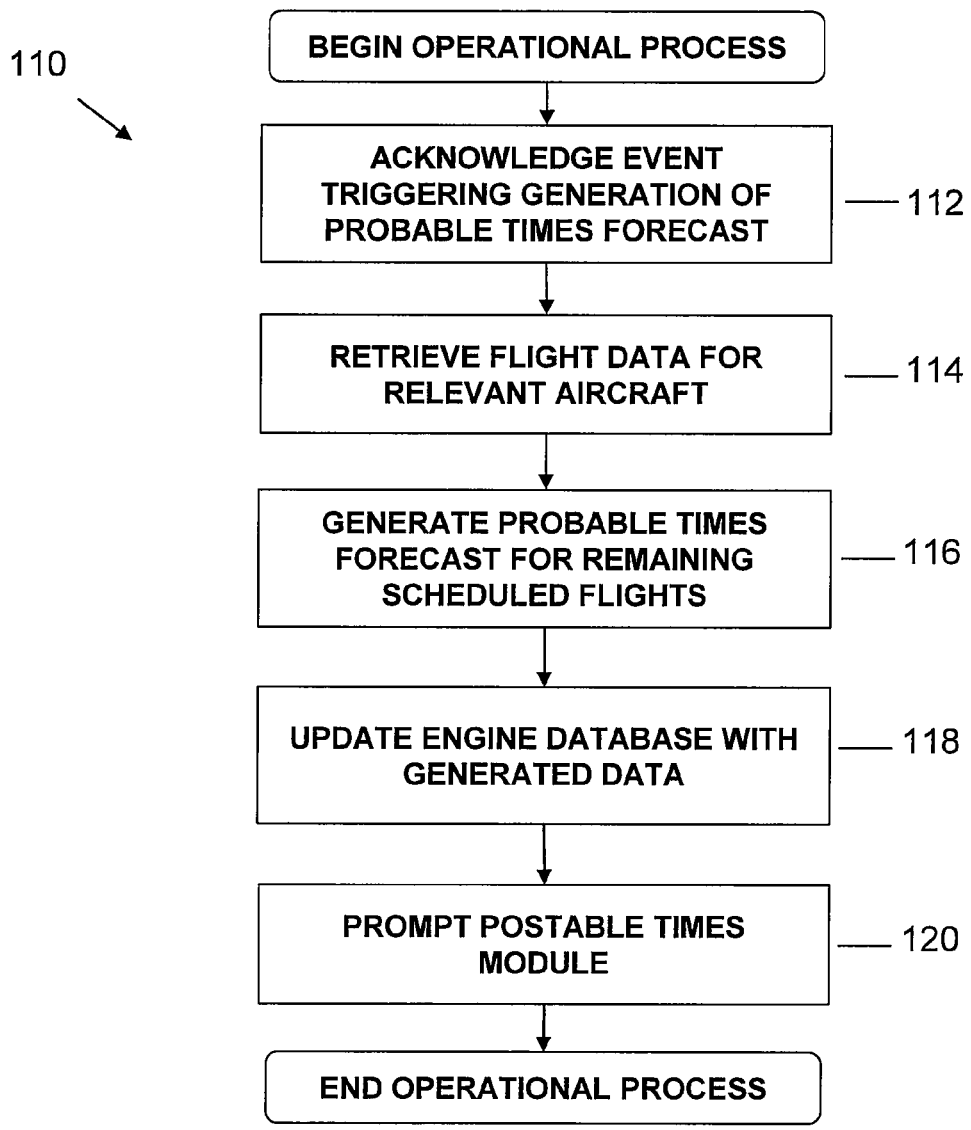
FIG. 5 is a flow chart illustration of yet another forecasting method executed during the operation of the process of FIG. 3, according to an exemplary embodiment.

Referring now to FIG. 5, an example operational process 110 for automatically generating a probable times forecast is shown. In step 112, the probable times module 44 receives or detects an event that triggers the generation of a probable times forecast. In an exemplary embodiment, the event precipitating a probable times forecast is one of a prompt from the projected times module 42 and an update to the parameters of an existing probable times forecast.

The probable times module 44 then proceeds to step 114 and retrieves the relevant aircraft's flight data from the database 36 for use in the generation of a new or updated probable times forecast. Where the trigger event is a prompt from the projected times module 42, the retrieved data will comprise the projected times forecast most recently generated by the projected times module 42. Where the trigger event is an update to the parameters of an existing probable times forecast, the retrieved data will further comprise the updated parameters. In several exemplary embodiments, the travel data retrieved by the probable times module 44 additionally includes data pertaining to resources that are not currently allocated to a flight but that are or can be made available for use in connection with that flight leg.

In step 116, the probable times module 44 analyzes the most recently generated projected times forecast and generates estimated minimization amounts, each associated with a potential corrective action that might be taken to reduce or adjust flight delays in the remaining flights scheduled for the aircraft. In several exemplary embodiments, the probable times module 44 then generates the probable times forecast based on the minimization amount that will result a minimization or elimination of the delay value for the aircraft's next flight leg. In several exemplary embodiments, the probable times module 44 then generates the probable times forecast based on the minimization amount of minimization amounts that will result a minimization or elimination of the cumulative delay across the aircraft's remaining flight legs. In such exemplary embodiments, the probable times forecast is generated without accounting for the effect of elected corrective actions on flights other than those scheduled for the subject aircraft.

In several exemplary embodiments, the probable times module 44 generates the probable times forecast in the step 116 based on the minimization amount or minimization amounts that will result in the smallest cumulative delay across the operating entity's comprehensive flight schedule. In some such exemplary embodiments, the corrective actions elected in connection with a delayed flight will be those actions that do not cause or contribute to a delay in at least one other flight leg that is greater than that being reduced or eliminated in the flight in question. For example, a flight delay caused by unscheduled aircraft unavailability may be corrected by reallocation of another aircraft to that flight. In some such exemplary embodiments, if the reallocation of the aircraft to the potentially delayed flight will cause an even greater delay for the flight to which the aircraft was originally allocated, the corrective action of reallocating the aircraft will not generate a minimization amount.

In several exemplary embodiments, the probable times module 44 operates subject to predefined parameters, tolerances and preferences that limit or restrict the electibility of corrective actions. In some such exemplary embodiments, a corrective action is only electible if the minimization amount generated for that action results in no or permissible disruption of the schedules of other flights. For example, if Flight A is facing a projected delay of 3 hours due to unscheduled unavailability of an aircraft and cabin crew, potential corrective actions might include reallocation of the aircraft of Flight B and the cabin crew of Flight C to Flight A. In some such exemplary embodiments, such corrective action will only be electible if the resulting delays in Flights B and C are of an acceptable duration in light of the reduction or elimination of the delay in Flight A, as determined by predefined parameters and tolerances under which the probable times module 44 generates the minimization amount.

In several exemplary embodiments, the probable times module 44 utilizes user input pertaining to corrective action with respect to a particular flight. In some such embodiments, prior to generating a probable times forecast, the probable times module 44 generates a list of potential corrective actions and minimization amounts, and a forecast is generated only after a user (such as, for example, SOC or FAA personnel) elects the corrective actions upon which the forecast is to be based. In other exemplary embodiments, the probable times module 44 generates multiple probable times forecasts, based on varying combinations of corrective actions, each with a minimization amount, in a single iteration of step 116 and presents the different forecasts to a user for election of one or more particular corrective actions.

In still other exemplary embodiments, the probable times module 44 generates a probable times forecast according to predefined parameters, tolerances and preferences (as described above) and allows for iterative regeneration of the forecast in response to user input, which comes in the form of at least one of specification of alternate corrective action and redefinition of parameters, tolerances and preferences requiring election of alternate corrective action.

In several exemplary embodiments, the probable times module 44 initiates a probable times forecast in response to at least one of a set of express and inferred events that does not include a prompt from the projected times module 42. Such exemplary embodiments operate as described above and make use of the most recently generated projected times forecast for the flight in question. In some such exemplary embodiments, user specification of a corrective action or predefined parameters, tolerances and preferences (as described above) relating to election of correction action constitutes an express event. In other of such exemplary embodiments, an update to the database 36—an update to flight data or resource data, for example—that impacts the most recently generated probable times forecast constitutes an inferred event. In some such exemplary embodiments, the expiration of a specified amount of time since the last generation of a probable times forecast constitutes an inferred event.

After the probable times forecast is completed, the probable times module 44 proceeds to step 118 and updates the database 36 with the data generated during the forecasting operation 110. In several exemplary embodiments, this data includes, at a minimum, the probable times forecast for the flight in question. The update may also include any data generated during the formulation of the probable times forecast.

Figure 6:
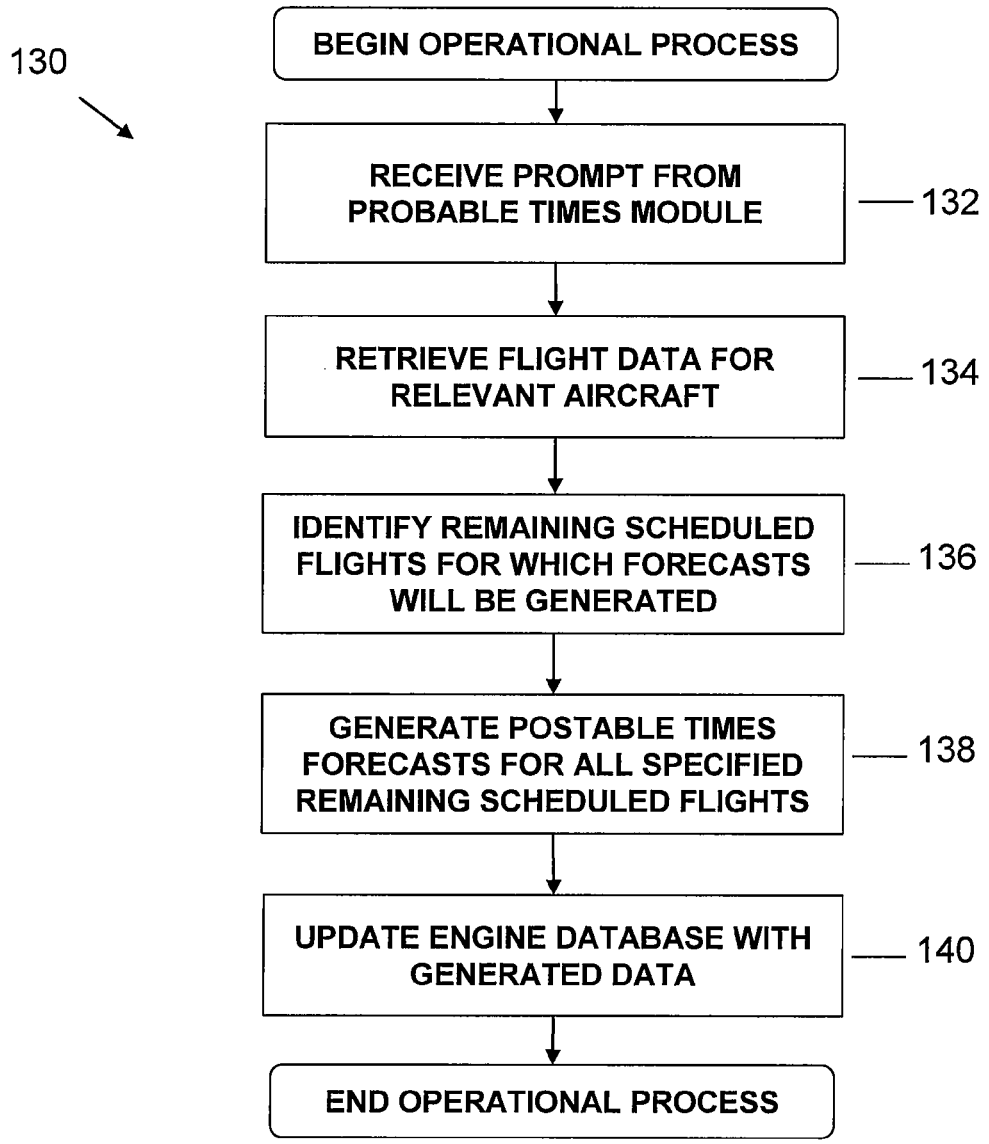
FIG. 6 is a flow chart illustration of a forecasting method executed during the operation of the process of FIG. 3, according to an exemplary embodiment.

The projected times module 42 then proceeds to step 120 and prompts the postable times module 46 to initiate operational process 130 (FIG. 6).

Referring now to FIG. 6, an example operational process 130 for automatically generating a postable times forecast is shown. In step 132, the postable times module 46 receives or detects an event that initiates the generation of a postable times forecast. In several exemplary embodiment, the event that precipitates a postable times forecast is a prompt from the probable times module 44.

The postable times module 46 responds to the event in step 134 and retrieves the relevant flight data from the database 36 for use in the generation of a new or updated postable times forecast. The retrieved travel data will comprise the probable times forecast most recently generated by the probable times module 44. In several exemplary embodiments, the data retrieved by the probable times module 44 additionally includes historical data pertaining to propagation and resolution of delays under circumstances similar to those of the flight(s) in question.

In step 136, the postable times module 46 identifies those remaining scheduled flights for which postable times forecasts are to be generated. In several exemplary embodiments, the postable times module 46 does not generate postable times forecasts for scheduled flight legs for which scheduled departure times are deemed to be too distant in the future at the time the postable times forecast is generated. In such exemplary embodiments, the postable times module 46 is restricted by uncertainty parameters that reflect uncertainty regarding the reliability of any forecast due to variability of flight circumstances and the possibility of a delay having been rectified prior to a scheduled departure time. In several exemplary embodiments, the uncertainty parameters reflect reduced uncertainty as the forecasted time draws nearer. In several exemplary embodiments, the postable times module 46 does not generate postable times forecasts for flights for which historical flight data indicates a certain probability that a delay will have been rectified prior to a scheduled departure time. In some such exemplary embodiments, such uncertainty parameters are determined, in part, by consideration of the operational status of the location from which the flight leg in question will depart. For example, an airport that serves as an airline "hub," or regional center of operations, is generally expected to possess more resources and provide more opportunities to reduce or eliminate a delay, while a "spoke," or outlying destination, is generally expected to possess fewer resources and thus provide fewer opportunities to reduce or eliminate a delay.

In step 138, the postable times module 46 generates a postable times forecast for the flights identified in the step 136. In some exemplary embodiments, the postable times forecast is based on parameters that determine the extent to which the postable times forecast is intended to reflect delays indicated by the corresponding probable times forecast. In some such exemplary embodiments, the postable times forecast will reflect a conservative estimate of the departure times for a flight, the estimate being based on the probability of the flight delay being resolved in advance of the scheduled departure times. In some such exemplary embodiments, delays reflected by a projected times forecast or a probable times forecast will not be reflected in the postable times forecast unless the delays exceed a minimum threshold value.

In step 140, the postable times module 46 updates the database 36 with the data generated during the forecasting operation 130. In several exemplary embodiments, this data includes, at a minimum, the postable times forecast for the flight in question. In some such exemplary embodiments, the update further includes any data generated during the execution of the operational process 130.

In several exemplary embodiments, the projected times, probable times and postable times forecasts generated in the operational processes 90, 110 and 130, respectively, are continuously updated through an iterative process. In some such exemplary embodiments, the varying conditions reflected by updates to the flight data in the database 36 result in regeneration of one or more of the forecasts, as described above. In some such exemplary embodiments, although the operational process 70 focuses on one aircraft at a time and conducts forecasting operations with respect to only that aircraft's remaining scheduled flights, the flight data that is associated with those operations includes data (such as, for example, resource availability and allocation data) that also reflects conditions and circumstances relating to other aircrafts' flight schedules. Thus, in such exemplary embodiments, a delay realized by, or corrective action elected in connection with, one aircraft's flight leg will potentially be an event that causes the regeneration of one or more of the forecasts generated by the operational process 70 in connection with one or more other aircraft flight legs.

Figures 7A, 7B:
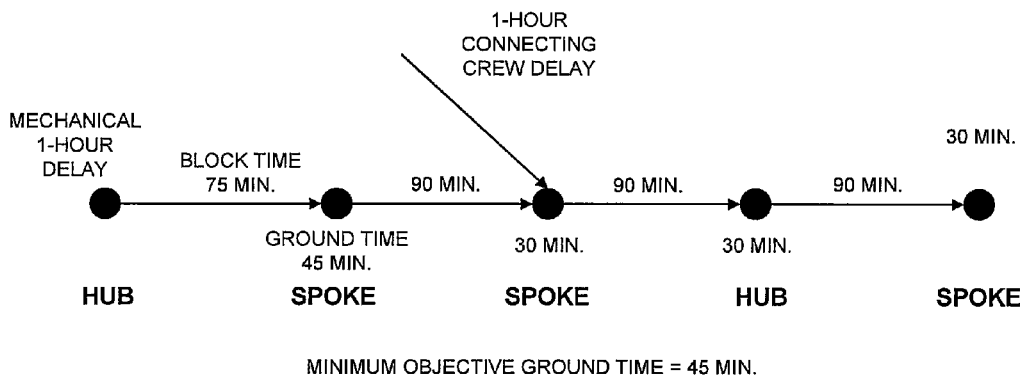
FIGS. 7A and 7B are diagrammatic illustrations of an example demonstrating the forecasting process shown in FIG. 3 and the methods shown in FIGS. 4-6, according to an exemplary embodiment.

Referring now to FIGS. 7A and 7B, an example scenario under an exemplary embodiment of the operational process 70 is shown. The flight schedule for an aircraft having several remaining scheduled flights is displayed. The "Scheduled Departure" data items indicate that Aircraft 457 is scheduled to depart Dallas at 11:00 am (with a block time of 75 minutes), depart from Austin at 1:00 pm (with a block time of 90 minutes), depart from San Jose at 3:00 pm (with a block time of 90 minutes), depart from Chicago at 5:00 pm (with a block time of 90 minutes), and depart from Indianapolis at 7:00 pm. The flight data shows that the actual departure time was 12:00 pm (as opposed to the scheduled 11:00 am). The flight data also shows that the "minimum objective ground time" (MOGT), or the shortest possible or allowable time span between flight legs, is 30 minutes and that a delay of 1 hour is already projected in connection with the arrival of crew members in San Jose. Finally, the flight data indicates the operational status (hub or spoke) of each of the airports.

The parenthetical within the Dallas "Scheduled Departure" data item indicates that, at 12:01 pm, the database 36 received the update indicating that the flight actually departed Dallas at 12:00 pm. In this example of an exemplary embodiment, this realization of an actual delay between the scheduled and actual departure times constitutes an inferred event in response to which the engine 12 prompts the engine 12 to generate projected, probable and postable times forecasts as described previously herein (FIG. 3). It is noted that no forecasts will be generated for the departure from Dallas, as that flight has already begun.

The prompt from the engine 12 initiates the operational process 70 as described in step 72 and all flight data for Aircraft 457 is retrieved as described in step 74. Step 76 begins and the projected times forecasting operation 90 (FIG. 4) automatically projects out the subsequent departure times for Aircraft 457 based on any intervening factors relevant to the next departure. In this example, the flight data shows that the block time for the first flight leg is 75 minutes and the scheduled ground time at the Austin airport is 45 minutes (which includes 15 minutes of slack, e.g., time above and beyond the minimum ground time for this type of airplane, which is 30 minutes). Accordingly the projected departure time for Austin is 13:45, which reflects a 12:00 previous departure+75 minutes for the block time and 30 minutes minimum ground time (step 92).

For the second flight, the block time is 90 minutes and the scheduled ground time at the San Jose airport is 30 minutes. Accordingly, the initial projected departure time from San Jose is 15:45, which reflects a 13:45 previous departure+90 minutes for the block time and 30 minutes minimum ground time (step 92). However, the flight data also indicates that the crew that will fly the next flight of this aircraft will not be available until 1 hour past the originally scheduled departure time of 15:00 pm. As such, the projected departure time will be 16:00, the earliest time at which the aircraft and the crew could depart (steps 96 and 98).

For the third flight leg, the projected departure time is 18:00, which reflects a 16:00 previous departure+90 minutes of block time and 30 minutes of ground time (step 92). For the fourth flight, the projected departure time is 20:00, which reflects an 18:00 previous departure+90 minutes of block time and 30 minutes of ground time (step 92).

The projected times module 42 does not identify any additional aircraft- or crew-related circumstances that will require a delay in addition to that already propagated through the flight schedule for the third and fourth flights (steps 996, 98 and 100), so the projected times stand, the database 36 is updated accordingly (step 104) and the projected times module 42 prompts the probable time module 44 to generate probable times of departure for Aircraft 457 (step 106).

The probable times module 44 receives the prompt from the projected times module 42 (step 112) and initiates the operational process 110 (FIG. 5). The probable times module 44 retrieves the flight data for Aircraft 457, which now includes the most recent projected times forecast for that flight (step 114), and automatically begins evaluating potential corrective actions to generate forecasted probable departure times for the remaining scheduled flights (step 116).

Continuing with the example flight data shown in FIGS. 7A and 7B for the second flight, the forecasted probable departure time is 13:45, which reflects a previous actual departure time of 12:00 plus 75 minutes of block time and 30 minutes of ground time. The projected times and probable times forecasts for the second flight are identical in this instance because the aircraft is departing from Austin, which is a spoke location and does not have, at this particular time, additional resources, such as extra crew or aircrafts, that will enable Aircraft 457 to depart at a time closer to the originally scheduled 13:00 departure time.

For the third flight, the forecasted probable departure time is 16:00. As described above in connection with the generation of the projected time forecast for this flight, this 16:00 departure time does not directly reflect the previous departure time of 13:45 plus 90 minutes of block time and 30 minutes of ground time because of a delay in the availability of connecting crew members. As with the Austin airport, the San Jose airport is a spoke location and does not have, at this particular time, additional resources that will enable Aircraft 457 to overcome the delay resulting from the unavailability of the connecting crew members and depart at a time closer to the originally scheduled 15:00 departure time.

For the fourth flight, the forecasted probable departure time is 17:15 (as opposed to the 18:00 projected departure time). In this example, the Chicago airport from which the flight is departing is a hub location and has additional planes and available crew that might be reallocated to the Chicago-Indianapolis flight. The probable times module 44 examines the available planes and crew and determines that an alternate plane and crew could be allocated, enabling a forecasted probable departure from Chicago at 17:15 (which is closer to the original scheduled departure time of 17:00 and is an improvement over the forecasted projected departure of 18:00).

For the fifth flight leg, the probable departure time is 19:15, which reflects the forecasted probable departure from Chicago at 17:15 plus 90 minutes block time and 30 minutes of ground time. No correctional measures are elected by the probable times module 44 in connection with this flight. Having completed the probable times forecast, the probable times module 44 updates the database 36 with the probable times forecast (step 118) and prompts the postable times module 46 to generate forecasted postable times of departure for the flight leg (step 120).

The postable times module 46 receives the prompt from the probable times module 44 (step 132) and initiates the operational process 130 (FIG. 6). For the postable times forecast, the postable times module 46 retrieves the flight data for Aircraft 457, which now comprises the most recent projected and probable times forecasts for the remaining flights scheduled for Aircraft 457 (step 134), and automatically takes into account variability in the forecast. In this example of an exemplary embodiment, historical data retrieved by the projected times module 46 show that there is a range of times within which an actual departure typically takes place under the various circumstances faced by Aircraft 457 in connection with the remaining scheduled flights. The postable times module 46 analyzes this historical data, determines to what extent such data should alter expectations or determine announcements of flight times (step 136), and produces a postable times forecast accordingly (step 138).

In this example of an exemplary embodiment, postable times forecasts are not generated for flights that are scheduled for departure more than 6 hours in the future. The flight legs departing Chicago and Indianapolis are scheduled to depart at 17:00 and 19:00, respectively. Accordingly, these flight legs are not the subject of postable times forecasts and the postable time data items associated with each are defaulted to the values of their scheduled departure times. Postable times forecasts will be generated for the second and third flights (departing from Austin and San Jose, respectively), however, as they fall within acceptable time parameters.

The probable time forecast of the departure time for the second flight leg (departing from Austin) is 13:45, so the postable times module 46 determines, based on predefined parameters, to what extent the postable times forecast will reflect the potential for variance between the forecasted probable time and the actual time of the departure. In this case, the postable times module 46 determines that, to an acceptable degree of probability, the probable times forecast contains up to 10 minutes of variability, and the postable times module 46 forecasts a departure time of 13:35 to reflect that variability factor.

For the third flight leg (departing from San Jose), the postable forecast accounts for variability relating to the potential for events that might occur to reduce the delay of the connecting crew. Even though there is a projected 1-hour delay by the crew, that event has not yet happened (and may not happen). Therefore, the postable forecast will reflect a conservative estimate of the delay based on the probability that the crew delay may be resolved. In this example, the postable forecast therefore becomes 15:30.

The postable times module 46 thus completes the postable times forecast and updates the database 36 accordingly (step 140) and the forecasting operation 130 ends, as does the operational process 70.

Figure 8:
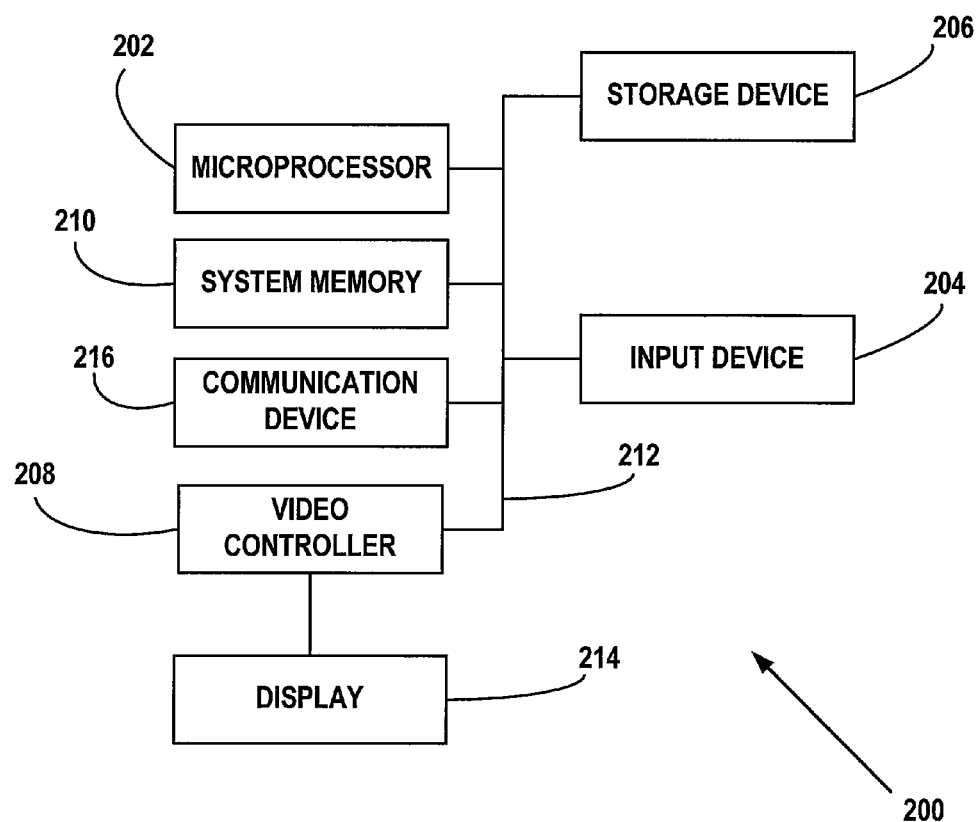
FIG. 8 is a diagrammatic illustration of a node for implementing one or more embodiments of the present disclosure.

It is understood by those having skill in the art that one or more (including all) of the elements/steps of the present disclosure may be implemented using software executed on a general purpose computer system or networked computer systems, using special purpose hardware-based computer systems, or using combinations of special purpose hardware and software. Referring to FIG. 8, an illustrative node 200 for implementing one or more embodiments of the present disclosure is depicted. Node 200 includes a microprocessor 202, an input device 204, a storage device 206, a video controller 208, a system memory 210, and a display 214, and a communication device 216 all of which are operably coupled to one another by one or more buses 212. The storage device 206 could include any type of computer readable medium. The storage device 206 could be a floppy drive, hard drive, CD-ROM, optical drive, or any other form of storage device. In addition, the storage device 206 may be capable of receiving a floppy disk, CD-ROM, DVD-ROM, or any other form of computer-readable medium that may contain computer-executable instructions. Further, the communication device 216 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones. In several exemplary embodiments, the node 200 and/or one or more components thereof, including one or more of the microprocessor 202, the input device 204, the storage device 206, the video controller 208, the system memory 210, the display 214, and the communication device 216, and/or any combination thereof, are distributed throughout the system 10 and/or one or more components thereof, and/or any combination thereof.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the present disclosure may be embodied in the RAM of a computer to transform a standard computer into a new specific computing machine.

Data structures are defined organizations of data that may enable an embodiment of the present disclosure. For example, a data structure may provide an organization of data, or an organization of executable code.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

A method has been described that includes receiving airline flight data in response to a trigger event, the airline flight data comprising a scheduled departure time of a first airline flight; generating a projected times forecast using the airline flight data, the projected times forecast comprising a projected departure time of the first airline flight, the projected departure time being based on the airline flight data, the projected departure time being the same as, or later than, the scheduled departure time, wherein generating the projected times forecast using the airline flight data comprises: evaluating the airline flight data to identify a delay associated with a second airline flight; determining a delay associated with the first airline flight, comprising propagating a delay value to the first airline flight, the delay value being based on the delay associated with the second airline flight; and determining the projected departure time of the first airline flight based on the delay associated with the first airline flight; generating a probable times forecast using the projected times forecast, the probable times forecast comprising a probable departure time of the first airline flight, the probable departure time being based on the projected departure time, the probable departure time being the same as, or earlier than, the projected departure time, wherein generating the probable times forecast using the projected times forecast comprises: determining a corrective action; and determining the probable departure time of the first airline flight based on the probable reduction of the delay associated with the first airline flight if the corrective action were to be implemented; and generating a postable times forecast using the probable times forecast, the postable times forecast comprising a postable departure time of the first airline flight, the postable departure time being based on the probable departure time and an uncertainty parameter associated with the reliability of the probable departure time, the postable departure time being the same as, or earlier than, the probable departure time, wherein generating the postable times forecast using the probable times forecast comprises: determining whether the scheduled departure time of the first airline flight occurs before a predetermined time threshold; and if the scheduled departure time occurs before the predetermined time threshold, then: determining the uncertainty parameter associated with the reliability of the probable departure time; and determining the postable departure time of the first airline flight based on the probable departure time and the uncertainty parameter.

A method has been described that includes receiving travel data; generating a projected times forecast using the travel data; generating a probable times forecast using the projected times forecast; and generating a postable times forecast using the probable times forecast. In an exemplary embodiment, the projected times forecast comprises a first departure time of a first travel leg, the first departure time being based on the travel data. In an exemplary embodiment, the probable times forecast comprises a second departure time of the first travel leg, the second departure time being based on the first departure time, the second departure time being the same as, or earlier than, the first departure time. In an exemplary embodiment, the postable times forecast comprises a third departure time of the first travel leg, the third departure time being based on the second departure time and an uncertainty parameter associated with the reliability of the second departure time, the third departure time being the same as, or earlier than, the second departure time. In an exemplary embodiment, generating the projected times forecast using the travel data comprises: evaluating the travel data to identify a delay associated with a second travel leg; determining a delay associated with the first travel leg, comprising: propagating a delay value to the first travel leg; and determining the first departure time of the first travel leg based on the delay associated with the first travel leg. In an exemplary embodiment, the delay value is the delay associated with the second travel leg. In an exemplary embodiment, determining the delay associated with the first travel leg further comprises: adjusting the delay value in accordance with at least one of the following: a slack time; an availability of a vehicle for the first travel leg; an availability of a crewmember for the first travel leg; and a ground time based on historical ground time data; wherein the adjustment to the delay value thereby determines the delay associated with the first travel leg. In an exemplary embodiment, generating the probable times forecast using the projected times forecast comprises: determining a corrective action; and determining the second departure time of the first travel leg based on the probable reduction of the delay associated with the first travel leg if the corrective action were to be implemented. In an exemplary embodiment, determining the corrective action comprises: receiving historical corrective action data; determining respective minimization amounts associated with a plurality of actions, the respective minimization amounts being based on the historical corrective action data; and selecting the corrective action from the plurality of actions; and wherein determining the second departure time of the first travel leg based on the probable reduction of the delay associated with the first travel leg if the corrective action were to be implemented comprises: modifying the delay associated with the first travel leg by the minimization amount associated with the corrective action. In an exemplary embodiment, the corrective action is a reallocation of a vehicle to the first travel leg. In an exemplary embodiment, the first travel leg has a scheduled departure time; and wherein generating the postable times forecast using the probable times forecast comprises: determining whether the scheduled departure time occurs before a predetermined time threshold; and if the scheduled departure time occurs before the predetermined time threshold, then: determining the uncertainty parameter associated with the reliability of the second departure time; and determining the third departure time of the first travel leg based on the second departure time and the uncertainty parameter. In an exemplary embodiment, the travel data is airline flight data, the first travel leg is a first airline flight, and the second travel leg is a second airline flight. In an exemplary embodiment, generating the projected times forecast using the travel data comprises: determining a delay associated with the first travel leg using the travel data; and determining the first departure time as a result of the delay; wherein generating the probable times forecast using the projected times forecast comprises: determining a corrective action; and determining the second departure time based on the probable reduction of the delay if the corrective action were to be implemented; and wherein generating the postable times forecast using the probable times forecast comprises: determining the uncertainty parameter; and determining the third departure time based on the second departure time and the uncertainty parameter. In an exemplary embodiment, the travel data is airline flight data, and the first travel leg is a first airline flight.

A system been described that includes a database containing travel data; a first module that generates a projected departure time of a first travel leg using the travel data; a second module that generates a probable departure time of the first travel leg using the projected departure time, the probable departure time being the same as, or earlier than, the projected departure time; and each of the first and second modules being operably coupled to the database. In an exemplary embodiment, the system includes a third module that generates a postable departure time of the first travel leg using the probable departure time, the postable departure time being based on the probable departure time and an uncertainty parameter associated with the reliability of the probable departure time, the postable departure time being the same as, or earlier than, the probable departure time. In an exemplary embodiment, the database comprises: a storage layer in which the travel data is stored; and an abstraction layer that routes the travel data to at least one of the first, second and third modules. In an exemplary embodiment, the system includes at least one processor; and a computer readable medium operably coupled to the at least one processor; wherein the first module comprises a first plurality of instructions stored in the computer readable medium and executable by the at least one processor, the first plurality of instructions comprising instructions for generating the projected departure time of the first travel leg using the travel data; wherein the second module comprises a second plurality of instructions stored in the computer readable medium and executable by the at least one processor, the second plurality of instructions comprising instructions for generating the probable departure time of the first travel leg using the projected departure time; and wherein the third module comprises a third plurality of instructions stored in the computer readable medium and executable by the at least one processor, the third plurality of instructions comprising instructions for generating the postable departure time of the first travel leg using the probable departure time. In an exemplary embodiment, instructions for generating the projected departure time of the first travel leg using the travel data comprise: instructions for determining a delay associated with the first travel leg using the travel data; and instructions for determining the projected departure time as a result of the delay; wherein instructions for generating the probable times forecast using the projected times forecast comprise: instructions for determining a corrective action; and instructions for determining the probable departure time based on the probable reduction of the delay if the corrective action were to be implemented; and wherein instructions for generating the postable times forecast using the probable times forecast comprise: instructions for determining the uncertainty parameter; and instructions for determining the postable departure time based on the probable departure time and the uncertainty parameter. In an exemplary embodiment, the travel data is airline flight data, and the first travel leg is a first airline flight.

A computer readable medium has been described that includes a plurality of instructions stored therein, the plurality of instructions comprising: instructions for receiving travel data; instructions for generating a projected times forecast using the travel data; instructions for generating a probable times forecast using the projected times forecast; and instructions for generating a postable times forecast using the probable times forecast. In an exemplary embodiment, the projected times forecast comprises a first departure time of a first travel leg, the first departure time being based on the travel data. In an exemplary embodiment, the probable times forecast comprises a second departure time of the first travel leg, the second departure time being based on the first departure time, the second departure time being the same as, or earlier than, the first departure time. In an exemplary embodiment, the postable times forecast comprises a third departure time of the first travel leg, the third departure time being based on the second departure time and an uncertainty parameter associated with the reliability of the second departure time, the third departure time being the same as, or earlier than, the second departure time. In an exemplary embodiment, instructions for generating the projected times forecast using the travel data comprise: instructions for evaluating the travel data to identify a delay associated with a second travel leg; instructions for determining a delay associated with the first travel leg, comprising: instructions for propagating a delay value to the first travel leg; and instructions for determining the first departure time of the first travel leg based on the delay associated with the first travel leg. In an exemplary embodiment, the delay value is the delay associated with the second travel leg. In an exemplary embodiment, instructions for determining the delay associated with the first travel leg further comprise: instructions for adjusting the delay value in accordance with at least one of the following: a slack time; an availability of a vehicle for the first travel leg; an availability of a crewmember for the first travel leg; and a ground time based on historical ground time data; wherein the adjustment to the delay value thereby determines the delay associated with the first travel leg. In an exemplary embodiment, instructions for generating the probable times forecast using the projected times forecast comprise: instructions for determining a corrective action; and instructions for determining the second departure time of the first travel leg based on the probable reduction of the delay associated with the first travel leg if the corrective action were to be implemented. In an exemplary embodiment, instructions for determining the corrective action comprise: instructions for receiving historical corrective action data; instructions for determining respective minimization amounts associated with a plurality of actions, the respective minimization amounts being based on the historical corrective action data; and instructions for selecting the corrective action from the plurality of actions; and wherein instructions for determining the second departure time of the first travel leg based on the probable reduction of the delay associated with the first travel leg if the corrective action were to be implemented comprise: instructions for modifying the delay associated with the first travel leg by the minimization amount associated with the corrective action. In an exemplary embodiment, the corrective action is a reallocation of a vehicle to the first travel leg. In an exemplary embodiment, the first travel leg has a scheduled departure time; and wherein instructions for generating the postable times forecast using the probable times forecast comprise: instructions for determining whether the scheduled departure time occurs before a predetermined time threshold; and instructions for if the scheduled departure time occurs before the predetermined time threshold, then: determining the uncertainty parameter associated with the reliability of the second departure time; and determining the third departure time of the first travel leg based on the second departure time and the uncertainty parameter. In an exemplary embodiment, the travel data is airline flight data, the first travel leg is a first airline flight, and the second travel leg is a second airline flight. In an exemplary embodiment, instructions for generating the projected times forecast using the travel data comprise: instructions for determining a delay associated with the first travel leg using the travel data; and instructions for determining the first departure time as a result of the delay; wherein instructions for generating the probable times forecast using the projected times forecast comprise: instructions for determining a corrective action; and instructions for determining the second departure time based on the probable reduction of the delay if the corrective action were to be implemented; and wherein instructions for generating the postable times forecast using the probable times forecast comprise: instructions for determining the uncertainty parameter; and instructions for determining the third departure time based on the second departure time and the uncertainty parameter. In an exemplary embodiment, the travel data is airline flight data, and the first travel leg is a first airline flight.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence, a leg of an airline sequence, an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plusfunction clauses are intended to cover the structures described herein as performing the recited function and not only structural equivalents, but also equivalent structures.

What is claimed is:

1. A method of releasing flight schedule information so that end users can access the released flight schedule information via one or more external applications and accordingly alter their expectations, the released flight schedule information comprising a postable departure time of an airline flight, the airline flight having a scheduled departure time, the end users comprising a plurality of passengers scheduled to depart on the airline flight, the method comprising:
- receiving, using a computer system, airline flight data comprising the scheduled departure time of the airline flight;
- determining that the scheduled departure time occurs before a predetermined time threshold and thus the scheduled departure time is close enough in the future;
- generating, using the computer system, a projected departure time of the airline flight, the projected departure time being later than the scheduled departure time due to a cumulative time delay, wherein generating the projected departure time comprises:
  - identifying one or more delays associated with the airline flight, the one or more delays comprising at least one of the following: one or more aircraft-related delays, one or more cockpit crew-related delays, and one or more cabin crew-related delays;
  - propagating the one or more delays to determine how each of the one or more identified delays affects the cumulative time delay; and
  - determining the projected departure time using the one or more propagated delays;
- generating, using the computer system, a probable departure time of the airline flight, the probable departure time being earlier than the projected departure time due to a probable reduction of the cumulative time delay, the probable reduction of the cumulative time delay being due to the implementation of at least one corrective action, wherein generating the probable departure time comprises:
  - receiving historical corrective action data;
  - determining respective minimization amounts associated with a plurality of actions, the at least one corrective action being one action in the plurality of actions, the respective minimization amounts being based on the historical corrective action data;
  - selecting the at least one corrective action from the plurality of actions; and
  - determining the probable departure time by reducing the cumulative time by at least the minimization amount associated with the at least one corrective action;
- generating, using the computer system, the postable departure time of the airline flight, the postable departure time being earlier than the probable departure time, the postable departure time reflecting at least one of:
  - a variability factor associated with the probable departure time so that the degree to which the postable departure time is earlier than the probable departure time is proportional to the degree of variability associated with the probable departure time; and
  - an estimate of the probability that the at least one of the one or more aircraft-related delays, the one or more cockpit crew-related delays, and the one or more cabin crew-related delays, will be resolved in advance of the scheduled departure time; and releasing the postable departure time so that the postable departure time is accessible to the end users via the one or more external applications.

2. A system for releasing flight schedule information so that end users can access the released flight schedule information via one or more external applications and accordingly alter their expectations, the released flight schedule information comprising a postable departure time of an airline flight, the airline flight having a scheduled departure time, the end users comprising a plurality of passengers scheduled to depart on the airline flight, the system comprising:
- at least one processor;
- a computer readable medium operably coupled to the at least one processor;
- a plurality of instructions stored in the computer readable medium and executable by the at least one processor, the plurality of instructions comprising:
- instructions for receiving airline flight data comprising the scheduled departure time of the airline flight;
- instructions for determining that the scheduled departure time occurs before a predetermined time threshold and thus the scheduled departure time is close enough in the future;
- instructions for generating a projected departure time of the airline flight, the projected departure time being later than the scheduled departure time due to a cumulative time delay, wherein the instructions for generating the projected departure time comprise:
  - instructions for identifying one or more delays associated with the airline flight, the one or more delays comprising at least one of the following: one or more aircraft-related delays, one or more cockpit crew-related delays, and one or more cabin crew-related delays;
  - instructions for propagating the one or more delays to determine how each of the one or more identified delays affects the cumulative time delay; and
  - instructions for determining the projected departure time using the one or more propagated delays;
- instructions for generating a probable departure time of the airline flight, the probable departure time being earlier than the projected departure time due to a probable reduction of the cumulative time delay, the probable reduction of the cumulative time delay being due to the implementation of at least one corrective action, wherein the instructions for generating the probable departure time comprise:
  - instructions for receiving historical corrective action data;
  - instructions for determining respective minimization amounts associated with a plurality of actions, the at least one corrective action being one action in the plurality of actions, the respective minimization amounts being based on the historical corrective action data;
  - instructions for selecting the at least one corrective action from the plurality of actions; and
  - instructions for determining the probable departure time by reducing the cumulative time by at least the minimization amount associated with the at least one corrective action;
- instructions for generating the postable departure time of the airline flight, the postable departure time being earlier than the probable departure time, the postable departure time reflecting at least one of:
  - a variability factor associated with the probable departure time so that the degree to which the postable departure time is earlier than the probable departure time is proportional to the degree of variability associated with the probable departure time; and an estimate of the probability that the at least one of the one or more aircraft-related delays, the one or more cockpit crew-related delays, and the one or more cabin crew-related delays, will be resolved in advance of the scheduled departure time; and instructions for releasing the postable departure time so that the postable departure time is accessible to the end users via the one or more external applications.

3. A non-transitory computer readable medium comprising a plurality of instructions stored thereon and executable by at least one processor, the plurality of instructions for releasing flight schedule information so that end users can access the released flight schedule information via one or more external applications and accordingly alter their expectations, the released flight schedule information comprising a postable departure time of an airline flight, the airline flight having a scheduled departure time, the end users comprising a plurality of passengers scheduled to depart on the airline flight, the plurality of instructions comprising:

instructions for receiving airline flight data comprising the scheduled departure time of the airline flight;

instructions for determining that the scheduled departure time occurs before a predetermined time threshold and thus the scheduled departure time is close enough in the future;

instructions for generating a projected departure time of the airline flight, the projected departure time being later than the scheduled departure time due to a cumulative time delay, wherein the instructions for generating the projected departure time comprise:

instructions for identifying one or more delays associated with the airline flight, the one or more delays comprising at least one of the following: one or more aircraft-related delays, one or more cockpit crew-related delays, and one or more cabin crew-related delays;

instructions for propagating the one or more delays to determine how each of the one or more identified delays affects the cumulative time delay; and instructions for determining the projected departure time using the one or more propagated delays;

instructions for generating a probable departure time of the airline flight, the probable departure time being earlier than the projected departure time due to a probable reduction of the cumulative time delay, the probable reduction of the cumulative time delay being due to the implementation of at least one corrective action, wherein the instructions for generating the probable departure time comprise:

instructions for receiving historical corrective action data;

instructions for determining respective minimization amounts associated with a plurality of actions, the at least one corrective action being one action in the plurality of actions, the respective minimization amounts being based on the historical corrective action data;

instructions for selecting the at least one corrective action from the plurality of actions; and instructions for determining the probable departure time by reducing the cumulative time by at least the minimization amount associated with the at least one corrective action;

instructions for generating the postable departure time of the airline flight, the postable departure time being earlier than the probable departure time, the postable departure time reflecting at least one of:

a variability factor associated with the probable departure time so that the degree to which the postable departure time is earlier than the probable departure time is proportional to the degree of variability associated with the probable departure time; and an estimate of the probability that the at least one of the one or more aircraft-related delays, the one or more cockpit crew-related delays, and the one or more cabin crew-related delays, will be resolved in advance of the scheduled departure time; and instructions for releasing the postable departure time so that the postable departure time is accessible to the end users via the one or more external applications.

\* \* \* \* \*